May 30, 1950  J. B. MILES  2,509,741
PRODUCTION OF FILAMENTOUS STRUCTURES
Original Filed Oct. 26, 1943  3 Sheets-Sheet 1

INVENTOR.
BY John B. Miles
Charles F. Daley
ATTORNEY

May 30, 1950 J. B. MILES 2,509,741
PRODUCTION OF FILAMENTOUS STRUCTURES
Original Filed Oct. 26, 1943 3 Sheets-Sheet 2

INVENTOR.
John B. Miles
BY Charles F. Daley
ATTORNEY

May 30, 1950     J. B. MILES     2,509,741
PRODUCTION OF FILAMENTOUS STRUCTURES Original Filed Oct. 26, 1943     3 Sheets-Sheet 3

INVENTOR.
BY John B. Miles
Charles F. Daley
ATTORNEY

Patented May 30, 1950

2,509,741

UNITED STATES PATENT OFFICE 2,509,741

PRODUCTION OF FILAMENTOUS STRUCTURES

John B. Miles, Richland, Wash., assignor to E. I. du Pont de Nemours & Company, Wilmington, Del., a corporation of Delaware Original application October 26, 1943, Serial No. 507,690. Divided and this application October 27, 1944, Serial No. 560,566

3 Claims. (Cl. 57—157)

This invention relates to new and improved filaments, yarns, cords and the like composed of a synthetic linear polymer. More particularly, this invention relates to the production of synthetic linear polymer filaments, yarns, cords and the like which have a very low "thermo-extensibility" factor and a low inflation growth.

This is a division of my copending application Serial No. 507,690, filed October 26, 1943, now abandoned. My said application Serial No. 507,690 is a continuation-in-part of Serial No. 464,381, filed November 3, 1942, now abandoned, which was a continuation-in-part of application Serial No. 414,880, filed October 13, 1941, now abandoned.

The invention will be described with particular reference to nylon filaments, yarns, cords and the like. The term "nylon" is used herein to generically designate the particular synthetic linear polyamides disclosed in Carothers U. S. Patents Nos. 2,130,948 and 2,071,253. Since, however, the other synthetic linear polymers disclosed in Carothers U. S. Patent No. 2,071,250 have characteristics similar to nylon, and since they may also be advantageously processed in accordance with the present invention, this application, in its broad aspects, relates to the processing of all cold-drawn synthetic linear polymers disclosed in the above-said Patent No. 2,071,250. The term "synthetic linear polymers" as used throughout the specification and claims is limited and restricted in scope to the specific synthetic linear polymers disclosed in said Patent No. 2,071,250.

It has recently been proposed to use cold-drawn nylon yarns, cords and monofils as strain-resisting, reinforcing elements in vulcanized rubber structures such as rubber tires, rubber belts, rubber hose and the like. (See Hoff Patent No. 2,273,200.) Nylon structures which have been cold-drawn to a residual elongation of 14% or less are considered to be completely cold-drawn since a subsequent cold-drawing operation will fail to substantially draw the same, i. e., permanently elongate the same with a higher degree of permanent orientation, to a substantially greater extent. In view of the exceedingly high tensile strength of completely cold-drawn filamentous nylon structures, it was expected that vulcanized rubber structures containing the same would be greatly superior to similar previously known rubber structures reinforced with cotton or high tenacity regenerated cellulose.

Vulcanized rubber structures reinforced with cold-drawn nylon yarns, cords and the like, although useful, did not have, heretofore, the high superiority expected of them.

Previously known filaments, yarns or cords of nylon, or other synthetic linear polymers, when incorporated as the reinforcing elements in a rubber tire, were found to have an objectionably high elongation upon inflation of the tire. This objectionably high elongation of the reinforcing elements often contributed directly to tire failure. The elongation of tire reinforcing elements due to tire inflation will hereinafter be referred to as "inflation growth."

It has also been found that previously known filaments, yarns and cords of nylon, as well as other synthetic linear polymers, have a permanent growth, or a permanent extensibility when under strain at high temperatures far below their melting point, for example, at temperatures of above 100° C. This characteristic of nylon, which in some respects appears to be different from yarn growth as heretofore referred to in the tire cord art with reference to cotton and rayon structures, will hereinafter be referred to as its thermo-extensibility. The thermo-extensibility of nylon is especially significant in truck tires. When a truck tire, constructed with nylon reinforcing structures, is run under heavy loads, the high temperatures developed together with the strains imposed thereon bring about a certain amount of permanent extensibility of the nylon reinforcing structures.

The "thermo-extensibility" of nylon filaments, yarns, cords and the like is different from the "inflation growth" thereof. When a tire reinforced with a nylon structure is inflated and put under load, there will be an initial stretch of the reinforcing structure which constitutes the inflation growth of the structure. Thereafter, under strains at continued high temperatures, the cords extend, or elongate, progressively and permanently. This constitutes the thermo-extensibility of the cords. In extreme cases, the tire will become too loose for the wheel and work its way off. Cracking of the tire tread may also occur because of this extension of the tire cord with a considerable diminishing of the life of the tire.

It is, therefore, an object of the present invention to provide a process and apparatus for producing cold-drawn filaments, yarns and cords composed of synthetic linear polymers which have a low thermo-extensibility and a low inflation growth.

It is a further object of this invention to treat cold-drawn filaments, yarns or cords composed of synthetic linear polymers to impart a low thermo-extensibility and a low inflation growth thereto.

It is another object of this invention to produce articles of manufacture which are subject to conditions of high temperature and high stress, said articles containing cold-drawn synthetic linear polymer filaments, yarns or cords having a low thermo-extensibility.

It is another object of this invention to produce vulcanized rubber tires containing cold-drawn synthetic linear filaments, yarns or cords having a low inflation growth.

It is a more specific object of this invention to produce vulcanized rubber tires and similarly reinforced vulcanized rubber structures containing as strain-resisting, reinforcing elements cold-drawn nylon filaments, yarns or cords having a low thermo-extensibility and a low inflation growth.

It is also an object of this invention to produce cold-drawn synthetic linear polymer filaments, yarns or cords having low thermo-extensibility, a low inflation growth, and also having a low elongation when stretched to the breaking point.

It is still a further object of this invention to provide cold-drawn synthetic linear polymer filaments, yarns or cords having a high modulus of elasticity.

Other objects of the invention will appear hereinafter.

The objects of the invention may be accomplished, in general, by subjecting a nylon, or other synthetic linear polymer, filament, yarn or cord to a dry heat treatment at a high temperature, i. e., a temperature between 100° C. and a temperature about 5° C. below the melting point of the polymer, and simultaneously subjecting the filament, yarn or cord to a stretch of at least 0.5% of its completely cold-drawn length. This dry heat treatment of the yarn or cord is carried out within a time period between 0.1 second and 8 hours. The filament, yarn or cord is then cooled to a temperature at least 5% lower than the treatment temperature before relaxing the same. The so-treated filamentous structure (filament, yarn or cord) can then be incorporated as the strain-resisting reinforcing element in a pneumatic tire or other article which in its use will be subjected to high stress and high temperatures.

The processing of filamentous nylon structures by heat under conditions of stretch is usually applied to such structures which have previously been completely cold-drawn; i. e., cold-drawn to a residual elongation, or break elongation, of 14% or less. However, it is within the scope of the present invention to apply the heat treatment to undrawn nylon structures while completely cold-drawing the same, it being necessary, however, that the heat treatment be applied while the structure is under stretch of at least 0.5% of its completely cold-drawn length.

It will be readily understood that the break elongation of a relatively small yarn having a low degree of twist will be lower than that of a large composite twisted and cabled structure. That is, of course, due to the elongation imparted to the twisted and cabled structure by virtue of the twist. Therefore, in order to obtain a true comparison throughout the specification and claims, any reference made to the break elongation of a nylon structure means the break elongation of the filaments of which the structure is composed. Unless otherwise designated, break elongation refers to the elongation at the breaking point, measured at room temperature (approximately 70° F.).

Where it is desirable to first produce yarns of relatively small denier, and then combine such yarns, by twisting, to form the final tire reinforcing structure, it is preferred to apply the above-described heat-stretch and cooling treatment to the relatively small denier yarn, then form the twisted tire reinforcing structure, and then again apply said heat-stretch and cooling treatment to the twisted tire reinforcing structure.

For convenience of comparison, the thermo-extensibility of a filamentous nylon structure is measured at a temperature of 135° C. (the temperature of pneumatic tires under drastic conditions of operation) under a load of 1 gram per denier. The thermo-extensibility of a filamentous nylon structure under these conditions shall hereinafter, for purposes of comparison, be referred to as its "thermo-extensibility factor." This factor may be computed as follows:

Given lengths of a cold-drawn filamentous nylon structure are loaded with a load of 1 gram per denier and subjected to a temperature of 135° C., in a room maintained at 25.5° C. and a relative humidity of 50%. The length of the structure is measured after thirty minutes exposure and again after 1,000 minutes exposure. The thermo-extensibility factor is computed with the aid of the equation:

$$T_x = \frac{\frac{L_{1000} - L_{30}}{L_0} \cdot 100}{1.523^1}$$

[1] $1.523 = \log 1000 - \log 30$.

where $T_x$ = thermo-extensibility factor
$L_{1000}$ = length of structure after 1,000 minutes exposure
$L_{30}$ = length of structure after 30 minutes exposure
$L_0$ = length of structure immediately after loading The numerical value of the thermo-extensibility factor for a yarn or cord will depend to a considerable extent on the twist and cord construction. In general, a highly twisted yarn or cord will have a higher thermo-extensibility factor than a similar untwisted yarn or cord. For convenience in comparing treated filaments, yarns and cords with similar untreated structures, thermo-extensibilty factor values, as given in the specification and claims, are based on determinations made on single filaments or no-twist yarns or cords. Such a comparison eliminates the effect of twist on the thermo-extensibility factor. In determining the thermo-extensibility factor of twisted yarn structures, the twist is first removed before the yarn is subjected to the loading conditions.

The thermo-extensibility factor of an untreated yarn, as well as that of a yarn treated in accordance with the invention, can be readily determined and from the two, a measure of the improvement in thermo-extensibility can be obtained. A convenient method of expressing improvement in thermo-extensibility is in terms of per cent reduction of the thermo-extensibility factor, which is the difference between the thermo-extensibility factor of an untreated cold-drawn, filamentous structure and the thermo-extensibility factor of a structure similarly cold-drawn and then treated in accordance with the present invention, expressed in percentage of the thermo-extensibility factor of the untreated structure.

Numerical values of "inflation growth" of tire reinforcing structures as referred to hereinafter are determined as follows:

A tire reinforcing structure, for example a tire cord, having a length of 6 feet under a tension of .01 gram per denier, is loaded under a tension of 1 gram per denier for a period of 30 minutes, while retaining the twist contained in said structure. The loading of the structure is carried out at a temperature of 70° F. and a relative humidity of 70%, with the structure in equilibrium with said conditions. The "inflation growth" of the structure is the difference between the 6 feet and the length, in feet, of the structure after the 30 minutes loading with 1 gram per denier. The "inflation growth," expressed as a percent of the 6 feet is the "inflation growth value."

Several preferred embodiments of apparatus suitable for use in accordance with the present invention are illustrated in the accompanying drawings to which specific reference is made in the following detailed description.

Figure 1:
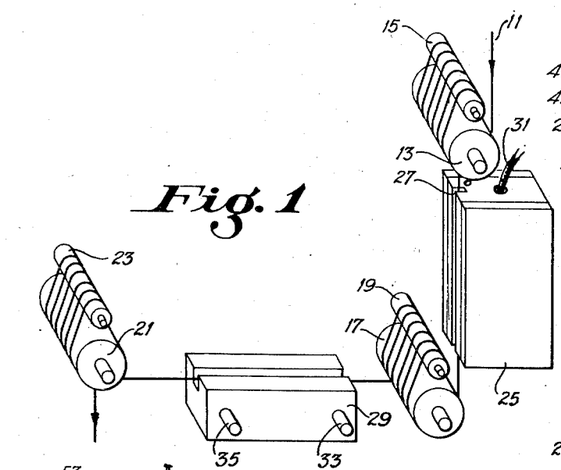
Figure 1 is a perspective view of a simple form of apparatus for heating a filamentous structure while maintaining the same stretched.

Referring to Figure 1 of the drawings, reference numeral 11 designates a yarn which is passed from any desired source successively about sets of drawing rollers 13—15, 17—19 and 21—23. Each set of drawing rollers comprises a drawing roller of comparatively large diameter and a separating roller of comparatively small diameter. In each set of drawing rollers, the axes of the two rollers are positioned at a slight angle to each other to cause a separation of the yarn helices and an advancement of the yarn along the rollers. The yarn is arranged with a sufficient number of turns about each set of drawing rollers to prevent slippage of the yarn thereon. The yarn passing from the drawing rollers 21—23 is collected in any desired manner such as by winding on a bobbin.

A heater 25 containing a yarn slot 27 is positioned between sets of drawing rollers 13—15 and 17—19, and a heater 29 is positioned between sets of drawing rollers 17—19 and 21—23. Heater 25 is heated by means of an electric resistance element within the body thereof to which is attached electric wires 31. Heater 29 is heated by means of a steam coil to which steam is passed through conduits 33 and 35.

The yarn 11 may be an undrawn nylon yarn which is completely cold-drawn under the influence of heat between rollers 13—15 and 17—19. The drawn yarn is then maintained under conditions of constant stretch between rollers 17—19 and 21—23 where it is heated to a temperature between 100° C. and the temperature at which melting of the nylon takes place. The yarn 11 may, on the other hand, be a completely cold-drawn yarn which is heated, while being maintained stretched, in two successive steps. The heat treated yarn must be maintained in the stretched state until it has cooled to a temperature at least 5% lower than the treatment temperature. The yarn must therefore be passed over drawing rollers 21—23 with a sufficient number of wraps to permit it to cool to this extent before relaxing the same.

Figure 2:
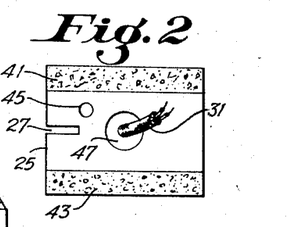
Figure 2 is a top plan view of a heating device for applying heat to yarn.
Figure 3:
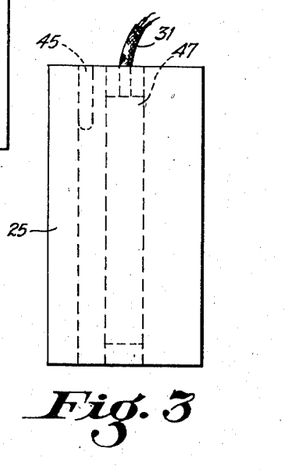
Figure 3 is a side elevational view of the heating device shown in Figure 2.

The heater 25 is shown in detail in Figures 2 and 3 and comprises insulating strips 41 and 43 on opposite sides thereof, electric resistance element 47 and thermometer well 45 in which may be positioned a thermometer 49.

While the description of the apparatus proceeds with particular reference to the treatment of yarn, it will be obvious that the operations may be carried out equally well on cords made from yarns. As will appear hereinbelow, the treatment of cords is particularly important when it is desired to produce a cord having a low inflation growth.

Figures 4 to 8 inclusive illustrate a yarn heating and stretching device in which a number of yarns may be processed simultaneously. In this device, a plurality of yarns 11 are passed from pirns 51 through yarn guides 53 and 55, then through a tension device 57, then about a set of draw rollers 59—61. The yarns from a plurality of the above mentioned devices are passed about grooved guide rollers 63 and 65. The yarns are then passed through slots 73 of the multiple slot heater 67 (see Figure 8). From the heater 67, the yarns are passed in spaced relationship to each other through hot air heating chamber generally designated by 88. From heating chamber 88, the individual yarns are passed about grooved guide rollers 107, then to individual sets of draw rollers 109—111. From draw rollers 109—111, the yarn is passed about guide roller 113, then through a reciprocating traverse guide 115, and finally wound on bobbin 117 which may be rotated by means of a driven surface drive roller 119.

The multiple slot heater 67 above referred to may be heated by means of a hot fluid, such as hot oil. The fluid is passed into heater 67 through inlet conduit 69. The heater 67 is provided with a bore 71 through which the hot fluid is passed to heat the slots 73. The fluid passes from heater 67 through outlet conduit 75. From conduit 75, the fluid is passed through spaced parallel conduits 79 and 83 by means of connecting conduits 77 and 81. The fluid then passes from the device through outlet conduit 85.

Figure 7:
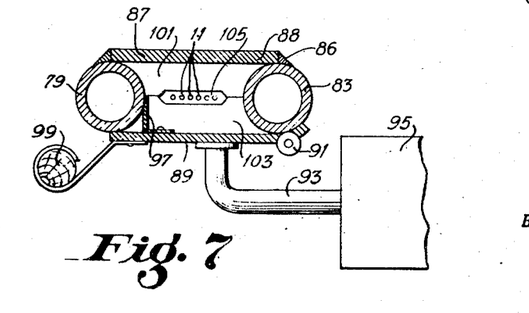
Figure 7 is an enlarged sectional view taken along the line 7—7 of Figure 4.
Figure 8:
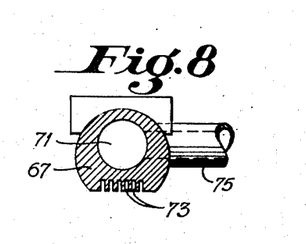
Figure 8 is an enlarged sectional view taken along the line 8—8 of Figure 4.

The parallel conduits 79 and 83, together with fixed plate 87 and hinged plate 89, define the heating chamber 88 referred to above. Plate 87 may be welded to the conduits as shown at 86. The plate 89 is hinged to the conduit 83 at 91 and the plate is pressed against conduit 79 by means of arm 93 and weight 95. The plate 89, adjacent conduit 79 is provided with a heat sealing angle iron 97. An operating rail 99 is fixed to plate 89 adjacent conduit 79. End plates 101 and 103 are provided between the conduits and plates as shown in Figure 7. The end plates aid in retaining heat in the chamber. The end plates are cut at their line of junction to provide a slot 105 through which the yarn passes into and from the heating chamber 88.

Figures 4, 6:
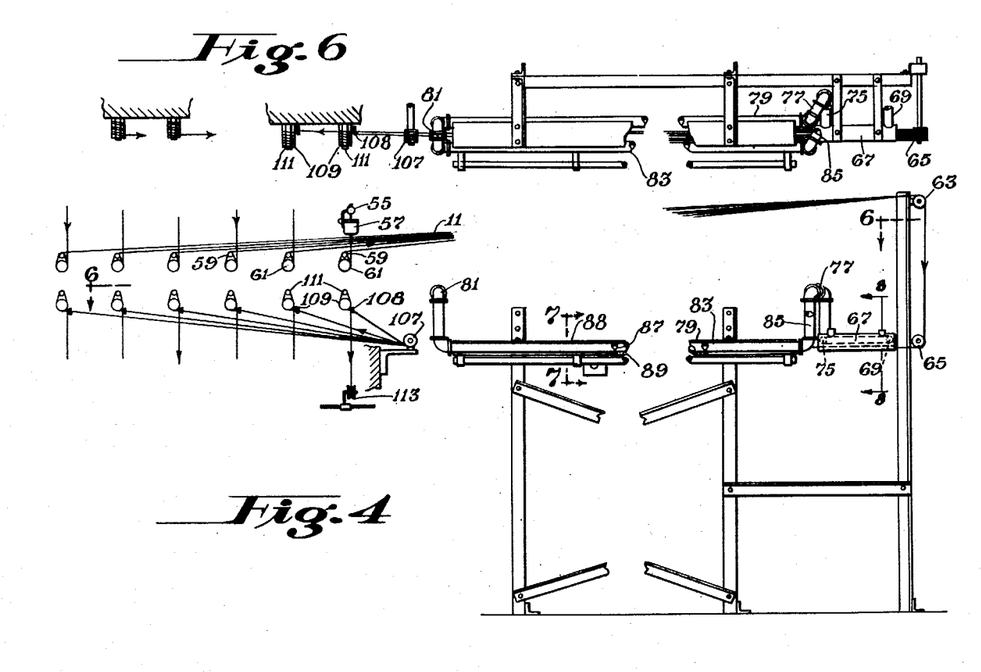
Figure 4 is a broken front elevational view showing a yarn heating and stretching device suitable for the simultaneous processing of a plurality of yarns.
Figure 6 is a top plan view showing a portion of the device shown in Figure 4.
Figure 5:
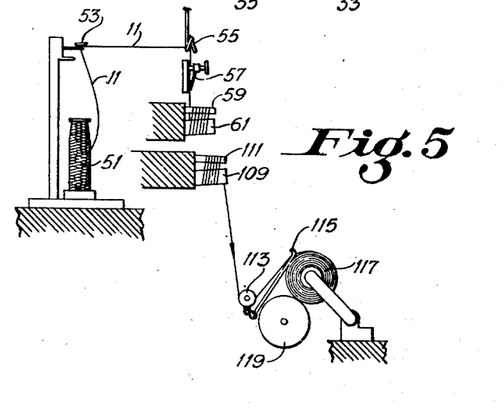
Figure 5 is a side elevational view showing a portion of the device shown in Figure 4.

As above indicated, each yarn has its individual set of draw rollers 59—61 and 109—111. These sets of draw rollers are adjusted in peripheral speeds to impart and maintain the desired stretch on the yarn while the latter is being heated.

Figure 9:
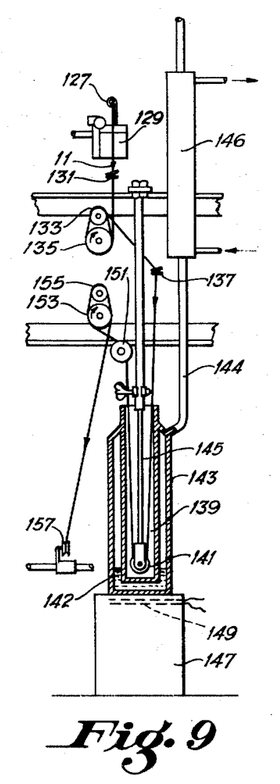
Figure 9 is a front elevational view, with parts shown in section, of a modified form of apparatus constructed in accordance with the invention.
Figure 10:
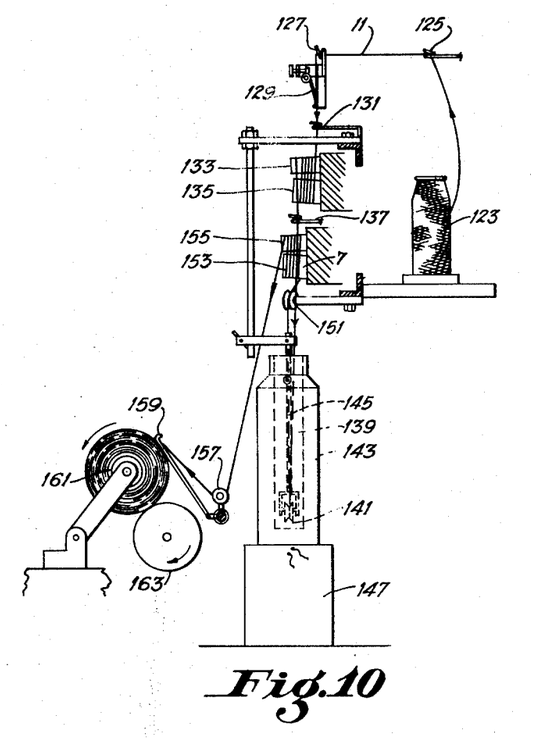
Figure 10 is a side elevational view of Figure 9 and showing also a winding means for the treated yarn.

Figures 9 and 10 of the drawings illustrate a modified form of apparatus which is particularly useful to cold-draw an undrawn, or partially drawn, yarn and while it is being completely drawn and, therefore, in a stretched condition, subjecting the same to a high temperature (above 100° C.) to reduce the thermo-extensibility of the yarn.

The yarn 11 is passed from pirn 123 through yarn guides 125 and 127 and tensioning device 129 and then with a plurality of turns about a set of draw rollers 133—135. From draw rollers 133—135, the yarn is passed about yarn guides 137 and 141. Roller yarn guide 141 is positioned within a hot liquid, such as molten Wood's metal, in well 139 of heater 143. The guide 141 is positioned on the end of a retractable supporting rod 145. The Wood's metal may be maintained at an even heat by a constant temperature boiling liquid 142 in a jacket surrounding the well 139. The liquid is maintained at boiling temperature by means of an electrical resistance element 149 in heater 147. The volatilized liquid 142 passes through conduit 144 to condenser 146 where it is condensed and flows back into the jacket.

The yarn passes from roller guide 141 to roller guide 151, then about a second set of draw rollers 153—155. This second set of draw rollers is driven at a peripheral speed sufficiently greater than the peripheral speed of the draw rollers 133—135 so as to impose on the yarn a stretch of at least 0.5% over and above that stretch which is necessary to produce a fully drawn yarn. The drawn and processed yarn is then passed about a roller guide 157 and is wound on bobbin 161 with the aid of reciprocating traverse guide 159. Bobbin 161 is driven by means of surface drive roller 163.

In the embodiments of the invention shown in Figures 4 to 8 and Figures 9 and 10, it is again essential that the yarn be cooled to a temperature at least 5% lower than the heat treatment temperature before releasing the tension thereon. This can be accomplished by passing the yarn about the last set of draw rollers with a sufficient number of turns to permit cooling to this extent.

In the heating of the yarn, any desired apparatus may be used. Furthermore, any desirable heating medium may be used, for example, hot water, steam, electricity, diphenyl ether, Dowtherm (a mixture of diphenyl and diphenyl ether), paracymene and the like.

The following examples illustrate preferred methods of processing in accordance with the invention, but they are not to be considered as limitative of the invention.

EXAMPLE I

A polyhexamethylene adipamide yarn of 275 spun denier, 23 filaments spun from high viscosity (3,000–4,000 poises) polymer dried to a moisture content of 0.08% was cold-drawn to the maximum extent possible without causing a material number of broken filaments, namely 422% (ratio of final length to original length 4.22:1.0). After the drawing, two ends were plied while introducing two turns "S" twist. Then, three of these doubled ends were plied while introducing two turns "Z" twist. The resulting yarn had an inflation growth value of 5.3%, a modulus of elasticity of 0.28 gram per denier for 1% stretch and a no-twist, thermo-extensibility factor averaging 0.35. The thermo-extensibility factor was determined after removal of twist from the yarn. This yarn was then passed through molten Wood's metal with a 12 inch bath travel while applying a 10% stretch. The apparatus used was similar to that shown in Figures 9 and 10 of the drawings. The yarn was permitted to cool to a temperature more than 5% lower than the heat-treating temperature before release of the stretch tension. The Wood's metal bath was heated to various temperatures and the yarn was conducted through it at two different speeds. The thermo-extensibility factor and modulus of elasticity values for the yarn treated under these varying conditions are given in Table I below.

At 40 feet per minute yarn travel in the above described apparatus, an optimum temperature of the Wood's metal for thermo-extensibility factor reduction, modulus of elasticity increase and high tenacity is reached somewhere in the range between about 205° C. and 215° C. At temperatures of 220° C. or above, the tenacity is decreased to a greater amount than generally desired. Inflation growth values for three runs are also given in Table I under the 40 feet per minute yarn travel. The reduction in inflation growth of the yarn makes it particularly suitable for use in the preparation of cord for rubber tires.

TABLE I

| Wood's Metal Temperature | Thermo-Extensibility Factor | Reduction of Thermo-Extensibility Factor | Modulus of Elasticity in g./d. for 1% Stretch | Increase in Modulus | Tenacity | Break Elongation | Elongation at 1.86 grams per denier | Inflation Growth Value |
|---|---|---|---|---|---|---|---|---|
| | | YARN HEAT TREATED AT 40 FEET PER MINUTE | | | | | | |
| | | Per cent | | Per cent | Grams per denier | Per cent | Per cent | Per cent |
| 200° C | .12 | 66 | .34 | 21 | 6.3 | 9.3 | 4.5 | 2.6 |
| 211° C | .09 | 74 | .38 | 36 | 6.4 | 9.4 | 4.1 | 2.1 |
| 220° C | .15 | 57 | .36 | 29 | 6.0 | 9.9 | 4.2 | |
| 230° C | .13 | 63 | .30 | 7 | 5.8 | 9.8 | 4.5 | 2.1 |
| | | YARN HEAT TREATED AT 150 FEET PER MINUTE | | | | | | |
| 200° C | .15 | 57 | .28 | 0 | 6.4 | 9.6 | 5.0 | |
| 211° C | .13 | 63 | .38 | 36 | 6.4 | 9.3 | 4.3 | |
| 220° C | .14 | 60 | .37 | 32 | 5.6 | 8.7 | 4.3 | |
| 230° C | .14 | 60 | .34 | 21 | 5.6 | 9.4 | 4.2 | |
| | | CONTROL YARN FOR COMPARISON (NO HEAT TREATMENT) | | | | | | |
| | .30 | 0 | .28 | 0 | 6.7 | 12.0 | 5.1 | 5.3 |

(All determinations of values on the heat treated as well as control cord carried out under identical atmospheric conditions).

EXAMPLE II

A previously completely cold-drawn polyhexamethylene adipamide yarn was stretched 10% and heat treated. The yarn was passed around a first set of draw rollers, through a slot-type heater, as illustrated in Figure 1, around a second set of draw rollers running at a speed sufficiently greater than the first set to stretch the yarn 10%, through a second slot-type heater, around a third set of draw rollers running at the same speed as the second set so that the yarn was maintained at the 10% stretch as it passed through the second heater, and then to the wind-up. The yarn was passed over the third set of draw rollers with a sufficient number of turns to cool the yarn to a temperature more than 5% lower than the heat treating temperature. The two heaters were about three inches long.

Another sample of the same yarn was similarly heat treated with the exception that the first heater was eliminated and the temperature of the second heater was increased by 20° C. Table II gives the results for these two yarns and for a similar untreated yarn.

It will be observed that longer treatment at the lower temperature was more effective than a short treatment at the higher temperature.

TABLE II

| Stretch | First Slot Heater | | Second Slot Heater | | Wind-Up Speed | Tenacity | Break Elongation | Thermo-Extensibility Factor | Reduction of Thermo-Extensibility Factor |
|---|---|---|---|---|---|---|---|---|---|
| | Temperature | Exposure Time | Temperature | Exposure Time | | | | | |
| Per cent | | Seconds | °C. | Seconds | Feet per minute | Grams per denier | Per cent | | Per cent |
| 10 | 230°C | 0.1 | 230 | 0.1 | 175 | 5.8 | 9.8 | .16 | 58 |
| 10 | room | none | 250 | 0.1 | 175 | 5.3 | 11.9 | .25 | 34 |
| 0 | Untreated | | | | | 4.9 | 14.2 | .38 | 0 |

EXAMPLE III

A 457-denier, 156-filament, 440% cold-drawn (completely cold-drawn) polyhexamethylene adipamide yarn was hot-stretched 15% at a temperature of 210° C. for about 14 seconds by passing it at 50 feet per minute through a hot air chamber, the path of travel in the chamber being about 12 feet. The yarn was maintained in the stretched condition until it had cooled to a temperature more than 5% lower than the heat treatment temperature. The thermo-extensibility factor was reduced from 0.35 to 0.14, a 60% reduction. The break elongation was reduced from 12.4% to 7.9%, a 36% reduction. The elongation at a load of 1.86 grams per denier was reduced from 5.7% to 3.9%, a reduction of about 32%. The modulus of elasticity, as determined from the stress-strain curve plotted from measurements on a Scott tester was increased from 0.21 to 0.39 gram per denier for a 1% stretch, an 86% increase in the modulus.

EXAMPLE IV

A 900 denier, 345-filament polyhexamethylene adipamide yarn which was prepared from polymer having a melt viscosity of 700 poises and was drawn approximately 410% (ratio of final length to original length 4.1:1.0) (completely cold-drawn) was twisted 1½ turns per inch, and wound on a heavy aluminum bobbin under a tension of 2.5 grams per denier (about 10% stretch). The yarn, while maintained under this tension, was exposed to steam at a pressure of 60 pounds per square inch for ¾ hour and then cooled to room temperature before unwinding.

As shown in Table III, the treated yarn is much superior to the untreated yarn in thermo-extensibility characteristics. When twisted into a cord and used in the construction of 6-ply pneumatic tire, it will produce a tire that is very light in weight, considering the load it is designed to support. It will run at low operating temperatures and it will have a very remarkably low thermo-extensibility characteristic. The slightly lower tenacity of the treated yarn has very little effect on the durability and usefulness of the yarn in the tire; whereas, the marked improvement in the thermo-extensibility factor adds greatly to the life of the tire.

Steam at lower pressures than 60 pounds may be used. Higher steam pressure can be used for treating yarn for certain special uses, but since such treatment is likely to produce degradation of the yarn, especially if the time of treatment is prolonged, it is preferred not to go to higher steam pressures in treating yarns for use in tire cords.

TABLE III

| Tenacity grams per denier | Break Elongation | Elongation at 1.86 grams per denier | Modulus of Elasticity in g./d. for 1% Stretch | Increase in Modulus | Thermo-Extensibility Factor | Reduction of Thermo-Extensibility Factor |
|---|---|---|---|---|---|---|
| TREATED YARN | | | | | | |
| 5.5 | Percent 8.5 | Percent 4.3 | .38 | Percent 35.7 | .10 | Percent 78 |
| UNTREATED YARN | | | | | | |
| 5.7 | 15.0 | 5.8 | .28 | 0 | .45 | 0 |

EXAMPLE V

A 14-mil monofil polyhexamethylene adipamide yarn with a tenacity of 5.4 grams per denier, a break elongation of 15% and a thermo-extensibility factor of 0.53 was prepared from a polymer which had a melt viscosity of 3,000–4,000 poises. The monofil yarn had been drawn 500% in the presence of superheated steam.

The above mentioned monofil was hot-stretchset at a stretch ratio of 1.20 (20% stretch) by running it through a 40 inch, para-cymene-heated copper slot at 215° C. at the rate of 180 feet per minute. The conditioned monofil now had a tenacity of 5.5 grams per denier, a break elongation of 8.8% and a thermo-extensibility factor of 0.34.

EXAMPLE VI

A high viscosity (3,000–4,000 poises) undrawn polyhexamethylene adipamide yarn of 220 denier, 20 filaments was completely cold-drawn; during the drawing operation, the yarn was subjected to heat treatment. The yarn was passed around a set of draw rollers, then through a slot type heater, as illustrated in Figure 1, thence around a second set of draw rollers, thence through a second slot type heater, thence around a third set of draw rollers running at the same speed as the second set so that the yarn was held under tension while being heat treated. Before release of heat treatment tension, the yarn was cooled to a temperature more than 5% lower than the temperature of heat treatment. The heater between the first and second sets of draw rollers was designated as the drawing heater since drawing occurred as the yarn passed through it, and the heater between the second and third set of draw rollers was designated as the conditioning heater since hot conditioning occurred as the yarn passed through it. When a yarn is subjected to a drawing operation, it will usually retract a small per cent if allowed to relax after the drawing without further treatment. If the drawing is carried out under heating conditions, this elastic stretch must be maintained in the yarn during further heating, that is, during the hot stretched conditioning, if the best results in terms of low thermo-extensibility, low elongation, and high modulus of elasticity are to be obtained. The drawing heater was about three inches long and the conditioning heater about five inches long. The slot width was about 1/16 inch in each case. Typical conditions of treatment and the results obtained are shown in Table IV.

TABLE IV

| Draw Ratio | Drawing Heater | | Heat Treatment | | Wind-Up Speed | Tenacity | Break Elongation | Thermo-Extensibility Factor | Reduction of Thermo Extensibility Factor |
|---|---|---|---|---|---|---|---|---|---|
| | Temperature | Exposure Time | Temperature | Exposure Time | | | | | |
| | °C. | Seconds | °C. | Seconds | Feet per minute | Grams per denier | Per cent | | Per cent |
| 4.62 | 251 | 0.2 | 238 | 0.4 | 85 | 6.9 | 9.3 | .10 | 74 |
| 4.44 | 251 | 0.2 | 238 | 0.4 | 85 | 7.1 | 9.2 | .14 | 63 |
| 4.22 | Room Temperature Drawing | | | | ---------- | 6.9 | 10.9 | .38 | 0 |

The treated yarn is useful in constructing tires, belting, hose and the like articles.

EXAMPLE VII

A polyhexamethylene adipamide yarn spun from high viscosity (3,000–4,000 poises) polymer was drawn at a temperature of about 210° C. to the maximum extent possible without causing a material number of broken filaments, namely 580%, the yarn being held under the drawing tension until the temperature had fallen 10%. The yarn, after drawing, had a denier of 465 and a filament count of 46. It was twisted to 10.2 turns Z twist. Three of these twisted yarns were plied to form a cord using a twist of 10.6 S twist. The cord had a denier of 1490, a tenacity of 7.5 grams per denier, a break elongation of 17.5%, a thermo-extensibility factor of less than 0.3 and an inflation growth value of 5.4%. The cord was hot stretch-set by passing it through a 40 inch long brass slot at a speed of 140 feet per min., at a temperature of 210–215° C. and at a stretch of 24%. The cord was held under the stretch-set tension until the temperature of the cord had fallen 10%. The resulting cord had a denier of 1336, a tenacity of 8.0 grams per denier, an elongation of 12.3%, a thermo-extensibility factor of less than 0.3, and an inflation growth of 3.6%. Although the thermo-extensibility factor of the cord was satisfactory before the hot stretch-setting of the cord, the latter operation was necessary to reduce the inflation growth of the cord to a desirably low level.

EXAMPLE VIII

A polyhexamethylene adipamide yarn spun from high viscosity polymer was completely drawn without the application of heat. Four of these drawn yarns of 210 denier, 34 filaments, were plied using a twist of 13.6 Z twist and three of these plied structures were cabled using 7.4 S twist. The cord had a denier of 2795, a tenacity of 5.9 grams per denier, an elongation of 25.4%, a thermo-extensibility factor of about 0.6, and an inflation growth value of 7.9%. The cord was stretch-set by passing the same through a 30 inch heated slot at a speed of 45 feet per min., a temperature of 210–215° C. and a stretch of 36%. The cord was held at the stretch-set tension until the temperature thereof had fallen 10%. The resulting cord had a denier of 2400, a tenacity of 7.5 grams per denier, an elongation of 16.7%, a thermo-extensibility factor of less than 0.2 and an inflation growth of 3.7%. The hot stretch-setting of the cord therefore importantly reduced both the thermo-extensibility and the inflation growth of the cord.

Repeated reference has been made above to the necessity of maintaining the heat-treated, stretched yarn, or cord, under the stretching tension until it has cooled to a temperature at least 5% lower than the heat treatment temperature. If the tension on a heat-treated, stretched yarn is released while the latter is still at heat treatment temperature, the desirable reduction in thermo-extensibility factor will not be obtained. This is clearly illustrated in Table V which represents an example in which a completely cold-drawn polyhexamethylene adipamide yarn was stretched and heat-treated at a temperature of 210° C. to 215° C. and the stretch tension released from the yarn at varying temperatures.

From the above results, it will be seen that when the tension on the yarn is relaxed at about the treatment temperature, the desired lowering of thermo-extensibility factor to 0.3 is not obtained, but if the temperature is first lowered to 180° C. before tension release, the thermo-extensibility factor is lowered very considerably to 0.24. In order to lower the thermo-extensibility factor to the desired 0.3, the yarn must be cooled to a temperature at least 5% lower than the heat treatment temperature. To provide a reasonable margin of safety, the yarn is preferably cooled to a temperature at least 10% lower than the heat treatment temperature thereof.

In the several heat conditioning treatments described above, it is important for the yarn to be heat conditioned, and then cooled to a temperature at least 5% lower than the heat conditioned temperature while it is held in a stretched condition. By so doing, changes in the structure which result in the production of yarn having low thermo-extensibility characteristics are brought about.

Filaments, yarns and cords produced in accordance with the methods of the present invention have an average thermo-extensibility factor of 0.3 or less. Prior to this invention, no method was known for the production of a filamentous, synthetic linear polymer structure having an average thermo-extensibility factor of such a low value.

Filaments, yarns or cords in order to have great utility as strain resisting, reinforcing elements in tires, belts, hose and similar structures which are subjected to conditions of strain at relatively high temperatures should have an average thermo-extensibility factor of 0.3 or less.

Previously known nylon yards and cords, due to their high strength and elasticity, were useful as reinforcing elements in tires and the like. However, due to their relatively high thermo-extensibility, they did not come into direct competition with other known tire reinforcing elements.

It is believed that the superiority of the filaments, yarns or cords of the present invention will lead to their use as reinforcing elements in tires and the like in direct competition with cotton and regenerated cellulose cords and yarns.

A filament, yarn or cord, to be fully satisfactory as a tire reinforcing element, must have a low inflation growth value as well as a low thermo-extensibility factor. Yarn or cord structures having substantially no twist, i. e., having less twist than about one or two turns per inch, will have an inflation growth value which is satisfactorily low for use in tires (6% or less), if such yarn or cord has a thermo-extensibility factor of less than 0.3. On the other hand, yarn or cord structures having a considerable twist may or may not have a satisfactory low inflation growth value even though it has a thermo-extensibility factor of less than 0.3.

In order that yarn or cord structures having a considerable twist, e. g., a twist of 3 or more turns per inch (based on an 1100 denier yarn), will have a satisfactory inflation growth value, it is necessary that the final twisted structure be hot-stretch-set and cooled before relaxation in accordance with this invention. It is not sufficient that the cord be composited from yarns which have been hot-stretch-set in accordance with the process of this invention. By plying and twisting the individual yarns, the low inflation growth value imparted by the process of this invention to these individual yarns is substantially destroyed. Therefore, it is necessary that the cord be again processed in accordance with the process steps of hot stretch-setting and cooling before relaxation. In order to produce the most desirable twisted cord structures, it is, therefore, preferred that the individual yarns be hot-stretch-set and cooled prior to relaxation in accordance with the process of the invention, then two or more of such yarns plied and twisted to form the desired cord structure, and the cord structure finally again hot stretch-set and cooled. However, a satisfactory cord structure can be made by subjecting the final cord structure to hot-stretch-setting and cooling without first hot stretch-setting, and cooling, the individual yarns.

In the above described processes, the stretch applied during the heat treatment will, of course, in all cases be less than that which would break the yarn or break a material number of filaments thereof. As above stated, the completely drawn yarns, i. e., yarns which have been drawn to a point where their residual elongation is 14% or less, or cords made therefrom, are subjected to heat treatment while the yarn is stretched 0.5% to 60% of its drawn length. It will be noted in this connection that at elevated temperatures a synthetic linear polymer yarn or cord can be stretched to a greater extent than its "break elongation." It is essential that the structure be stretched at least 0.5% of its completely drawn length whether the drawn yarn is subsequently heat treated or whether it is heat treated during the drawing thereof. The preferred method of the present invention comprises the stretching of the heated yarn or cord (i. e., the structure that goes into the tire), as much as possible without breaking it and maintaining the yarn stretched while it is cooled to a temperature at least 5% lower than the heat treatment temperature. Obviously, the stretch that can be introduced will depend to a great extent on the type of synthetic linear polymers of which the yarn or cord structure is composed, the spinning conditions under which the structure was produced, the extent to which the yarn was previously cold-drawn, the construction of the cord (2 ply or 3 ply, etc.), the moisture content of the yarn or cord, etc. In the case of completely cold-drawn polyhexamethylene adipamide yarns, cords and the like, it is preferred that they be stretched between 0.5% and 60% of their completely drawn length when they are subjected to the heat treatment. In order to obtain useful

TABLE V

| Stretch Ratio | Heat Treatment Temperature | Temperature at Release of Tension | Treatment Speed | Yarn Denier | Yarn Tenacity, | Yarn Elongation, percent | | Thermo-extens. Factor |
|---|---|---|---|---|---|---|---|---|
| | | | | | | At Break | At 1.86 g./d. | |
| | °C. | °C. | | | Gr./Denier | | | |
| 1.16 | 210–215 | 20 | 144 ft./min | 393 | 6.0 | 8.8 | 3.8 | 0.12 |
| 1.16 | 210–215 | 60 | -----do----- | 390 | 5.9 | 9.1 | 4.0 | 0.14 |
| 1.16 | 210–215 | 80 | -----do----- | 385 | 6.0 | 9.9 | 4.0 | 0.14 |
| 1.16 | 210–215 | 100 | -----do----- | 393 | 6.0 | 11.0 | 5.3 | 0.12 |
| 1.16 | 210–215 | 120 | -----do----- | 381 | 6.3 | 11.3 | 5.3 | 0.14 |
| 1.16 | 210–215 | 150 | -----do----- | 391 | 6.1 | 12.2 | 5.9 | 0.15 |
| 1.16 | 210–215 | 180 | -----do----- | 399 | 5.8 | 13.3 | 6.6 | 0.24 |
| 1.16 | 210–215 | 210 | -----do----- | 418 | 5.4 | 14.8 | 8.1 | 0.35 | results, in the hot-stretching of twisted tire cord structures, the latter should be stretched at least 10% of their break elongation at the elevated temperature employed. Higher degrees of stretch will give improved properties, and in some cases it might be desirable to stretch the cords as high as 90% of their break elongation at the elevated temperature employed. It is clearly within the ability of anyone skilled in the art to determine the optimum stretching conditions for obtaining a yarn or cord of any particular thermo-extensibility factor and inflation growth.

In connection with the present invention, it has been found that if the yarn or cord structure is stretched at least 3% of its completely drawn length, a very desirable reduction of break elongation and an increase in modulus of elasticity of the structure will result. It will be seen from the examples that a stretch of about 10% imparts these desirable characteristics to the yarn. In general, it is desirable to produce yarns by the process of this invention which will have a break elongation of less than 14% and preferably between 8% and 14%.

As above indicated, it has now been established that a synthetic linear polymer yarn or cord having a thermo-extensibility factor of 0.3 or less and an inflation growth value of 6% or less has particular utility as a tire cord. This is true regardless of the break elongation of the yarn. It has been further established that synthetic linear polymer yarns which have a break elongation not to exceed 12% will have a similar high utility as strain resisting, reinforcing elements in tires and like structures, even though the thermo-extensibility factor is as high as 0.4.

Reference is also frequently made to the elongation at 1.86 grams per denier. This is done because it has been found that the performance of a tire in use does not depend on the elongation at break of the yarn constituting the strain resisting elements, but rather on the elongation at the working stress, which would generally be about 1.86 grams per denier for nylon. This corresponds to the elongation at about 10 pounds load on a 2,500 denier cord which is a test frequently applied in the pneumatic tire making art. The elongation at 1.86 grams per denier is sometimes termed the "stretch-ability" or "ease of stretching" since it represents the amount a yarn can be stretched with a given load. The yarn products of this invention have low stretchability as compared to prior nylon yarn.

A low value for the elongation at a given load, for example, at a load of 1.86 grams per denier, means that the yarn has a high modulus of elasticity since the modulus of elasticity is inversely proportional to the elongation at a given load. The modulus of elasticity expressed in grams per denier required to produce 1% stretch can be readily computed from the stress-strain curve for a given yarn, or it may be roughly computed by dividing 1.86 grams per denier by the elongation at that load. The stress-strain measurements from which the modulus of elasticity values given herein are taken were made on a Scott tester. The modulus in grams per denier required to produce a 1% stretch was calculated from the load required to produce a 3% stretch, but the stress-strain curves for these yarns are, in general, substantially linear from zero stretch up to and somewhat above 3% stretch. In general, it has been found desirable to treat yarns in accordance with this invention until the modulus of elasticity has been increased at least 5%, up to 100%, or even higher.

As above indicated, the yarn or cord may be dry heat treated while in contact with a heated solid surface, a heated liquid which is inert (non-reactive, non-solvent and non-swelling) to said yarn or cord, for example molten Wood's metal or a heated gaseous medium.

The temperature of the heating medium will depend on the type of heating equipment used, the heat transfer conditions, the size and speed of the yarn, the time of contact of the yarn with the heating medium and the chemical nature of the synthetic linear polymers. For example, a yarn or cord may be passed around a feed roll, then through a hot slot pre-heater, then through a 12-foot tubular hot air heater as shown in Figures 4 to 8 of the drawings. On the other hand, the yarn may be passed through Wood's metal as shown in Figures 9 and 10. Wood's metal gives a more intimate contact with the yarn and results in a faster transfer of heat. Hence, in general, a shorter bath travel is required for Wood's metal than for hot air. Other low melting metals, such as solder, may, of course, also be used.

The time of heating required to produce a low thermo-extensibility or a low inflation growth will depend on the type of polymer, the extent of previous drawing of the yarn, the degree of stretch applied to the yarn during the heat conditioning treatment, the type of heating equipment used, the heat transfer conditions and the temperature of the heat treating medium. In general, the higher the temperature of the heat treating medium under a given set of conditions, the shorter the time of treatment required to produce a given low thermo-extensibility value will be. The upper limits of the time and temperature of heating are dependent upon the deleterious effects of the heating on the tenacity of the yarn.

The low thermo-extensibility factor filaments, yarns, cords and the like of the present invention are of particular utility as strain resisting, reinforcing elements for rubber structures such as pneumatic tires, belts, hose and the like. They have general utility in all cases where permanent elongation due to heat and stress is objectionable. The low inflation growth has particular utility with respect to pneumatic tires but it also finds utility in other structures such as hose where it is not desired that when the structure is put under strain in the absence of heat, it becomes oversized. The filamentous structures of the present invention may be coated with any desirable coating materials for the production of structures resistant to thermo-extensibility. They may, for example, be coated with neoprene, phenol formaldehyde resins, vinyl resins, polyvinyl alcohol, vinyl chloride-vinyl acetate copolymers, vinylidene chloride polymers and copolymers thereof with vinyl chloride, methyl methacrylate resins, pyroxylin, cellulose acetate and other plastic materials.

The filamentous structures can be adhered to rubber by any of the known adhesives, for example resin-latex adhesives used for adhering rayon to rubber. They may also be adhered to rubber by means of a diisocyanate or diisothiocyanate as disclosed in the co-pending application of Herndon Serial No. 403,765, filed July 23, 1941, now Patent No. 2,439,514, issued April 13, 1948.

The synthetic linear polymers used for the manufacture of the yarns, cords or like structures of the present invention may contain addition agents such as antioxidants, light and heat stabilizing agents, such as phenolic compounds or derivatives of them, e. g. catechol, p-tertiary butyl catechol, formaldehyde or ketone condensation products with these catechols, o-hydroxyphenoxyacetic acid, "Permalux" (di-orthotolyl guanidine salt of dicatechol boric acid), gallic acid, phenol-formaldehyde resins and especially Bakelite resin #4036, anti-embrittlement agents, such as phenylalphanaphthyl amine, betanaphthyl amine, diphenyl guanidine and phenothiazine, fillers, plasticizers, etc.

The thermo-extensibilty of synthetic linear poly-amide structures can be more drastically reduced by the hot-stretch-setting process of this invention, if the filaments, yarns or cords prior to the hot-stretch-set treatment contain certain materials which are known to enhance the reduction of thermo-extensibility by the hot-stretch-set treatments. As examples of materials which have this property, the following may be named: phenols and condensation products of phenols with aldehydes or ketones, for example, tertiary butyl phenyl formaldehyde resin, phenol formaldehyde resins and parahydroxydiphenyl. These materials can be incorporated in the synthetic linear polyamide before spinning of the same, or if desirable, the yarn can be impregnated from a solution in which the above-identified materials are soluble. Stearic acid, applied to the synthetic linear polyamide yarn from a solution, also gives this increased reduction of thermo-extensibility upon hot-stretch-setting. In general, .01%-10% of the above-identified material may be added to the synthetic linear polyamide yarn. Preferably, these materials are added to the synthetic linear polyamide yarn between 1% and 5%. The above percentages are percentages by weight of the dry yarn.

Due to the remarkable flexibility and elasticity of these filaments, comparatively large filaments can be used and it is a matter of no importance whether or not all of the filaments become intimately associated with the rubber. It is, in fact, possible to use, as the reinforcing elements for tires and the like, fabrics constructed of individual, separate, exceedingly large filaments, called monofils, instead of multifilament cords. The monofils may be 10 denier, or even lower, and up to 1,000 denier, or even larger.

Although the products of this invention have been described in terms of their characteristics before being incorporated in a tire or other article, it is to be understood that these characteristics also apply to the filaments, yarns or cords after careful removal from a tire or other article.

The use of the filaments and yarns of this invention in combination with other textile yarns, such as cotton, regenerated cellulose, etc., is not precluded although best results are obtained by using nylon alone.

While the examples have been described in terms of nylon filaments and yarns prepared from polyhexamethylene adipamide, they are not so limited. For example, nylon filaments and yarns prepared from polyhexamethylene sebacamide, polydecamethylene sebacamide, 6-aminocaproic acid polymer and other polyamides and interpolyamides such as are disclosed in U. S. Patents Nos. 2,130,948; 2,214,405; 2,298,868 and 2,071,253 may also be processed in accordance with the invention. It is to be understood that filaments prepared from other synthetic linear polymers than synthetic linear polyamides may also be treated in accordance with the invention. These synthetic linear polymers include besides the polyamides, the polyesters, polyethers, polyacetals, mixed polyester-polyamides, etc., which, for example, may be prepared by a process of condensation polymerization as described in U. S. Patent No. 2,071,250. As above stated, the processing of structures in accordance with the invention must be carried out below the melting point of the yarn. Therefore, different temperature ranges for the heat treatment will be required for different polymers depending upon their melting points.

By the practice of this invention, it is possible to produce tires of remarkable strength and durability. Because of the great strength and good bending and tensile elasticity of these synthetic polyamide filaments, it is possible to use cords of much lower denier and of lower twist than is conventionally used with cotton or rayon cords. Because of this reduction in denier, it is possible to make much lighter and thinner tires which may, therefore, contain less rubber. Similarly, if cords of the same denier are used, lighter and thinner tires having the same strength as previously known tires can be produced by reason of fewer plies.

A quite unexpected result is that when the invention is carried out on the cord or the ultimate structure going into the tire and in the high ranges of stretch, the filaments or elementary groups of filaments are forced together approaching hexagonal close packing which results in a cord or structure of surprisingly higher density. This is desirable since a cord of given strength which occupies less volume at constant strength permits the construction of even thinner tires and the use of less rubber per tire.

Moreover, since during the vulcanizing step, the nylon filaments tend to adjust themselves to the non-uniform stresses, in the final tire all are resisting strain uniformly. The usual safety factor commonly employed may be substantially reduced with consequent further diminutions in the amount of nylon required per unit of rubber for a given load. This reduction in thickness and weight of the tire not only reduces the centrifugal forces to which it is subjected and reduces the cost of construction, but it also decreases the heat produced upon the flexing of the tire and in turn increases the rate of dissipation of the heat.

This invention makes possible tire cords having a low elongation, both at breaking stress and at the working stress which is, generally speaking about 1.86 grams per denier. This is most desirable in a tire cord, as previously pointed out. Nylon yarns for tire cords having elongations at a load of 1.86 grams per denier of 25% less than the best known prior nylon yarns for tire cords are made possible by the invention (see Table III). Break elongation of 30% less than that of the best previously known nylon yarns is made possible (see Example II, Table II and Example III).

This invention also makes possible nylon filaments, yarns and cords of high tenacity, which is a very desirable attribute of cords for use in tires, as well as for many other purposes.

Because of the high resistance to permanent deformation, the wide elastic limits of these polyamide yarns, and their tendency to show a very low "plastic flow," it is possible to produce rubber tires and like products according to the invention which show remarkably small growth due to thermo-extensibility of the reinforcing element.

The term "rubber," as used throughout the specification and claims, of course, includes synthetic rubber as well as natural rubber.

Other improved products containing filaments, yarns and cords treated in accordance with this invention include power transmission belting, parachute cords and fabrics, airplane fabrics, balloon cloth, casings for self-sealing airplane fuel containers, bristles for general use, fishing leaders, sewing thread, shower curtains, umbrellas, etc.

Since it is obvious that many changes and modifications can be made in the details above described without departing from the nature and spirit of the invention, it is to be understood that the invention is not to be limited to these details except as set forth in the appended claims.

I claim:

1. The process of producing a twisted synthetic linear polymer cord structure having a low thermo-extensibility and inflation growth which comprises subjecting a synthetic linear polymer yarn in its completely drawn state, to a dry heat treatment at a temperature between 100° C. and about 5° C. below the melting point of the polymer while the yarn has a stretch of at least 0.5%, cooling the yarn to a temperature at least 5% lower than said treatment centigrade temperature while maintaining the structure in said stretched condition, plying and twisting at least two of said yarns to produce a cord, subjecting said cord to a dry heat treatment at a temperature between 100° C. and about 5° C. below the melting point of said polymer while the cord has a stretch of at least 0.5%, and cooling the cord to a temperature at least 5% lower than said cord treatment centigrade temperature while maintaining the structure in said stretched condition.

2. The process of producing a twisted synthetic linear polymer cord structure having a low thermo-extensibility and inflation growth which comprises subjecting a synthetic linear polymer yarn in its completely drawn state, to a dry heat treatment at a temperature between 100° C. and about 5° C. below the melting point of the polymer while the yarn is in a stretched condition of at least 0.5%, cooling the yarn to a temperature at least 5% lower than said treatment centigrade temperature while maintaining the structure in said stretched condition, plying and twisting at least two of said yarns to produce a cord, subjecting said cord to a dry heat treatment at a temperature between 100° C. and about 5° C. below the melting point of said polymer while the cord has a stretch of at least 10% of its break elongation at the elevated temperature employed, and cooling the cord to a temperature at least 5% lower than said cord treatment centigrade temperature while maintaining the structure in said stretched condition.

3. Process of producing a twisted synthetic linear polymer cord structure having a low thermo-extensibility and inflation growth which comprises plying and twisting at least two completely drawn synthetic linear polymer yarns to produce a cord, subjecting said cord to a dry heat treatment at a temperature between 100° C. and about 5° C. below the melting point of said polymer while the cord has a stretch of at least 0.5% and cooling the cord to a temperature at least 5% lower than said cord treatment centigrade temperature, while maintaining the structure in said stretched condition.

JOHN B. MILES.

REFERENCES CITED

The following references are of record in the file of this patent:

UNITED STATES PATENTS

| Number | Name | Date |
|---|---|---|
| 1,921,426 | Niogret | Aug. 8, 1933 |
| 2,137,235 | Carothers | Nov. 22, 1938 |
| 2,142,912 | Moncrieff et al. | Jan. 3, 1939 |
| 2,157,117 | Miles | May 9, 1939 |
| 2,157,119 | Miles | May 9, 1939 |
| 2,197,896 | Miles | Apr. 23, 1940 |
| 2,226,529 | Austin | Dec. 31, 1940 |
| 2,239,780 | Fikentscher et al. | Apr. 29, 1941 |
| 2,244,208 | Miles | June 3, 1941 |
| 2,251,508 | Watson | Aug. 5, 1941 |
| 2,285,552 | Alfthan | June 9, 1942 |
| 2,289,377 | Miles | July 14, 1942 |
| 2,293,825 | Hosfield | Aug. 25, 1942 |
| 2,295,593 | Miles | Sept. 15, 1942 |
| 2,307,846 | Miles | Jan. 12, 1943 |
| 2,313,173 | Schneider et al. | Mar. 9, 1943 |
| 2,321,635 | Taylor | June 15, 1943 |
| 2,328,125 | Buchsbaum et al. | Aug. 31, 1943 |
| 2,339,323 | Feild | Jan. 18, 1944 |
| 2,341,423 | Catlin | Feb. 8, 1944 |
| 2,360,352 | Lodge | Oct. 17, 1944 |
| 2,385,403 | Conway | Sept. 25, 1945 |
| 2,389,655 | Wende | Nov. 27, 1945 |

Certificate of Correction

Patent No. 2,509,741                                                                                          May 30, 1950

JOHN B. MILES

It is hereby certified that errors appear in the printed specification of the above numbered patent requiring correction as follows:

Column 3, line 60, for the word "That" read *This*; column 4, line 46, for "thermo-extensibilty" read *thermo-extensibility*; columns 7 and 8, Table I, second column thereof, last line, for ".30" read *.35*; column 13, line 44, for "yards" read *yarns*; and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*